United States Patent
Kumar

(10) Patent No.: US 9,681,514 B1
(45) Date of Patent: Jun. 13, 2017

(54) DIMMER CONFIGURED FOR PROVIDING SINKING AND SOURCING CURRENT OUTPUTS

(71) Applicant: Crestron Electronics, Inc., Rockleigh, NJ (US)

(72) Inventor: Russikesh Kumar, Ridgewood, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/336,381

(22) Filed: Oct. 27, 2016

(51) Int. Cl.
   *G05F 1/00* (2006.01)
   *H05B 33/08* (2006.01)
(52) U.S. Cl.
   CPC ..... *H05B 33/0845* (2013.01); *H05B 33/0815* (2013.01); *H05B 33/0887* (2013.01)
(58) Field of Classification Search
   CPC ................. G05F 1/10; G05F 1/44; G05F 1/66
   USPC ........................................ 323/212, 217, 905
   See application file for complete search history.

(56) References Cited

U.S. PATENT DOCUMENTS

| 5,608,312 | A | 3/1997 | Wallace |
| 8,698,407 | B1 * | 4/2014 | Chen ................. H05B 33/0812 315/185 R |
| 9,084,306 | B1 | 7/2015 | Bohler et al. |
| 9,451,661 | B2 * | 9/2016 | Jao ..................... H05B 33/0845 |
| 2010/0289428 | A1 | 11/2010 | Frazier et al. |
| 2014/0266114 | A1 * | 9/2014 | Chern ...................... G05F 1/56 323/282 |

FOREIGN PATENT DOCUMENTS

WO   WO2012119244   9/2012

OTHER PUBLICATIONS eCircuit Center, Push-Pull Output Stage, 2002, available at www.ecircuitcenter.com/Circuits/pushpull/pushpull.htm.

* cited by examiner

*Primary Examiner* — Thuy Vinh Tran
(74) *Attorney, Agent, or Firm* — Crestron Electronics, Inc.

(57) ABSTRACT

A lighting dimmer circuit that provides sinking and sourcing current outputs. The sinking and sourcing dimmer circuit may comprise first and second amplifiers, first and second NPN transistors, and first and second independent feedback loops. The dimmer is configured for providing a variable output voltage signal (Vout) to a sinking load or a sourcing load. When the output voltage signal (Vout) is coupled to a sinking load, current flows from a positive power supply (Vpos), through the first NPN transistor, and to the sinking load. When the output voltage signal (Vout) is coupled to a sourcing load, current flows from the sourcing load, through the second NPN transistor, and to the ground. In addition to the independent feedback loops, the gain of second amplifier may be greater than the gain of the first amplifier to ensure there is no undesired contention between the first and the second NPN transistor.

18 Claims, 5 Drawing Sheets

DIMMER CONFIGURED FOR PROVIDING SINKING AND SOURCING CURRENT OUTPUTS

BACKGROUND OF THE INVENTION

Technical Field

The present invention relates generally to load control devices, and more specifically to a lighting dimmer that provides sinking and sourcing current outputs.

Background Art

Traditionally, 0-10V dimmers were used for providing dimming to fluorescent ballasts. These 0-10V dimmers have recently been adapted for dimming light emitting diode (LED) drivers. 0-10V dimmers provide a direct current (DC) voltage control signal that varies between zero and ten volts. The LED driver and fluorescent power supplies determine the desired light level based on the voltage level provided by the dimmer. However, as LED technology became more prevalent, many LED drivers have come to market that do not source current, but require a dimmer capable of sourcing current on its control port.

Classical 0-10V dimmers provide a sink only output, i.e. they can only sink current. The ballast or driver is the current source. FIG. 1 illustrates a traditional 0-10V dimmer circuit 100 that provides sink only output to a current sourcing driver 101. The sink only dimmer circuit 100 utilizes an operational amplifier (opamp) 103 connected at its inverting input (−) to a control voltage input Vin 102, at its non-inverting input (+) to a feedback loop 106, and at its output to the base (B) of a negative-positive-negative (NPN) type transistor 104. The NPN transistor 104 is connected at its collector (C) to the output voltage signal Vout 108 that is used to control the current sourcing driver 101. The NPN transistor 104 is connected at its emitter (E) to the ground 109. The current sourcing driver 101 typically comprises a direct current (DC) power supply 111 that provides a voltage source to a load 110. The load 101 couples to the collector (C) of the NPN transistor 104, which provides a grounded connection to the load 110. The NPN transistor 104 provides a current sink when the sink only dimmer circuit 100 is connected to the current sourcing driver 101—i.e., current flows from the driver 101 through the NPN transistor 104 to the ground 109. However, the sink only dimmer circuit 100 cannot operate with current sinking drivers.

FIGS. 2A-2B illustrate a standard push-pull drive circuit 200 with an opamp feedback loop, which may be adapted to be used in a dimmer to sink or source its output. Such a circuit 200 comprises an opamp 205 connected at its non-inverting input (+) to a control voltage input Vin 203, at its inverting input (−) to a feedback loop 206, and at its output to the bases (B) of a NPN type transistor 208 and positive-negative-positive (PNP) type transistor 209. The NPN transistor 208 is connected at its collector (C) to a positive power supply Vpos 210 and at its emitter (E) to the output voltage signal Vout 212 and to the emitter (E) of the PNP transistor 209. The collector (C) of the PNP transistor 209 is connected to a negative power supply Vneg 211.

Depending on the type of driver a dimmer containing circuit 200 is connected to, the feedback loop 206 will turn either transistor 208 or transistor 209 on. For example, as shown in FIG. 2A, the output voltage signal Vout 212 of circuit 200 may be connected to a sinking driver 201, which typically comprises a load 215 connected to a ground 216. When circuit 200 is connected to a non-sourcing or sinking driver 201, the 0-10V control voltage input Vin 203 causes current to flow from Vpos 210 through the NPN transistor 208 and to the output load 215 of the driver 201. Accordingly, the load 215 is pulled up to receive voltage from the positive power supply Vpos 210. The opamp 205 and feedback 206 ensure the output voltage Vout 212 matches the input signal voltage Vin 203. The positive power supply Vpos 210 is required to be greater than 10V to allow for the $V_{BE}$ drop of transistor 208 and provide headroom for the opamp 205. For example, a suitable value for Vpos 210 may be 14V.

As shown in FIG. 2B, when a dimmer containing circuit 200 is connected to a conventional driver 101 containing a load 110 that is sourcing current, current flows from the load 110, through transistor 209 and to the negative power supply Vneg 211. Circuit 200, however, requires the addition of the negative power supply Vneg 211 for generating a negative voltage. A negative power supply Vneg 211 is required to compensate for the $V_{BE}$ drop of transistor 209 and provide headroom for opamp 205. Inclusion of such a power supply 211 in a dimmer circuit generates a significant cost and space burden. Additionally, circuit 200 requires a PNP type transistor 209, which is generally more expansive and less readily available than a NPN type transistor.

Accordingly, there is now a need for improved lighting dimmer that can provide sinking and sourcing current outputs.

SUMMARY OF THE INVENTION

It is an object of the embodiments to substantially solve at least the problems and/or disadvantages discussed above, and to provide at least one or more of the advantages described below.

It is therefore a general aspect of the embodiments to provide a lighting dimmer that can provide sinking and sourcing current outputs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to a first aspect of the embodiments, a dimmer circuit that provides sinking and sourcing current outputs is provided. The dimmer circuit comprises first and second amplifiers each comprising a non-inverting input (+), an inverting input (−), and an output. The dimmer circuit further comprises first and second transistors each comprising a first terminal having one of a base and a gate, a second terminal having one of a collector and a drain, and a third terminal having one of an emitter and a source. The first amplifier is connected at its non-inverting input (+) to a control voltage input (Vin), at its inverting input (−) to an output voltage signal (Vout) via a first feedback loop, and at its output to the first terminal of the first transistor. The first transistor is connected at its second terminal to a positive power supply (Vpos) and at its third terminal to the output voltage signal (Vout). The second amplifier is connected at its inverting input (−) to the control voltage input (Vin), at its non-inverting input (+) to the output voltage signal (Vout) via a second feedback loop, and at its output to the first terminal of the second transistor. The second transistor is connected at its second terminal to the output voltage signal (Vout) and at its third terminal to the ground.

According to an embodiment, each of the transistors comprises an NPN transistor. According to another embodiment, each of the transistors may comprise an n-channel field-effect transistor.

According to an embodiment, when the output voltage signal (Vout) is coupled to a sinking load, current flows from the positive power supply (Vpos), through the first transistor, and to the sinking load. When the output voltage signal (Vout) is coupled to a sourcing load, current flows from the sourcing load, through the second transistor, and to the ground. The output voltage signal (Vout) may comprise a variable voltage signal in the range from about 0V to about 10V.

According to an embodiment, the first feedback loop may comprise a first resistive voltage divider comprising a first resistor and a second resistor connected in series, wherein an input voltage to the first resistive voltage divider (Vdin) is connected to the output voltage signal (Vout) and the output voltage out of the first resistive voltage divider (Vdout) is connected to the inverting input (−) of the first amplifier. The second feedback loop may comprise a second resistive voltage divider comprising a third resistor and a fourth resistor connected in series, wherein an input voltage to the second resistive voltage divider (Vdin) is connected to the output voltage signal (Vout) and the output voltage out of the second resistive voltage divider (Vdout) is connected to the non-inverting input (+) of the second amplifier. Each of the first and second amplifiers may provide a gain to the control voltage input (Vin) to output an amplified output voltage signal (Vout), and wherein each of the first and second resistive voltage dividers of the first and second feedback loops provide a fraction of the amplified output voltage (Vout) back to the first and second amplifiers.

According to an embodiment, each of the first and second amplifiers may provide a gain to the control voltage input (Vin) to output an amplified output voltage signal (Vout), wherein the gain of the second amplifier is greater than the gain of the first amplifier. The difference in the gains prevent contention between the first and second transistors. The gains may be set as close as possible to cover tolerances of components of the circuit without sacrificing accuracy of the output voltage signal (Vout).

According to an embodiment, the dimmer circuit may further comprise a microcontroller unit configured for generating a variable duty cycle waveform indicating a desired dimming level; wherein the dimmer circuit further contain an RC circuit configured for smoothing out the variable duty cycle waveform into a variable analog waveform. According to another embodiment, the dimmer circuit may further comprise a microcontroller and a third feedback loop connected at its first end to the output voltage signal (Vout) and at its second end to the microcontroller, wherein the microcontroller is configured for detecting a fault. The microcontroller may be configured for: monitoring the output voltage signal (Vout); determining whether the output voltage signal (Vout) is within a predetermined tolerance level; and disabling the output voltage signal (Vout) when the output voltage signal (Vout) is outside of the predetermined tolerance level. The third feedback loop may comprise a resistive voltage divider, wherein an input voltage to the resistive voltage divider (Vdin) is connected to the output voltage signal (Vout) and an output voltage out of the resistive voltage divider is connected to the microcontroller, wherein the resistive voltage divider outputs a fraction of the output voltage signal (Vout).

According to another aspect of the embodiments, a dimmer circuit that provides sinking and sourcing current outputs is provided. The dimmer circuit comprises first and second amplifiers each comprising a non-inverting input (+), an inverting input (−), and an output. The dimmer circuit further comprises first and second transistors each comprising a first terminal having one of a base and a gate, a second terminal having one of a collector and a drain, and a third terminal having one of an emitter and a source. The first amplifier is connected at its non-inverting input (+) to a control voltage input (Vin), at its inverting input (−) to an output voltage signal (Vout) via a first feedback loop, and at its output to the first terminal of the first transistor. The first transistor is connected at its second terminal to a positive power supply (Vpos) and at its third terminal to the output voltage signal (Vout). The second amplifier is connected at its inverting input (−) to the control voltage input (Vin), at its non-inverting input (+) to the output voltage signal (Vout) via a second feedback loop, and at its output to the first terminal of the second transistor. The second transistor is connected at its second terminal to the output voltage signal (Vout) and at its third terminal to the ground. When the output voltage signal (Vout) is coupled to a sinking load, current flows from the positive power supply (Vpos), through the first transistor, and to the sinking load. When the output voltage signal (Vout) is coupled to a sourcing load, current flows from the sourcing load, through the second transistor, and to the ground. Furthermore, each of the first and second amplifiers may provide a gain to the control voltage input (Vin) to output an amplified output voltage signal (Vout), wherein the gain of the second amplifier is greater than the gain of the first amplifier, wherein the difference in the gains prevent contention between the first and second transistors.

According to yet another aspect of the embodiments, a dimmer circuit that provides sinking and sourcing current outputs is provided. The dimmer circuit comprises first and second amplifiers each comprising a non-inverting input (+), an inverting input (−), and an output. The dimmer circuit further comprises first and second NPN transistors each comprising a base, a collector, and an emitter. The first amplifier is connected at its non-inverting input (+) to a control voltage input (Vin), at its inverting input (−) to an output voltage signal (Vout) via a first feedback loop, and at its output to the base of the first NPN transistor. The first NPN transistor is connected at its collector to a positive power supply (Vpos) and at its emitter to the output voltage signal (Vout). The second amplifier is connected at its inverting input (−) to the control voltage input (Vin), at its non-inverting input (+) to the output voltage signal (Vout) via a second feedback loop, and at its output to the base of the second NPN transistor. The second NPN transistor is connected at its collector to the output voltage signal (Vout) and at its emitter to the ground. When the output voltage signal (Vout) is coupled to a sinking load, current flows from the positive power supply (Vpos), through the first NPN transistor, and to the sinking load. When the output voltage signal (Vout) is coupled to a sourcing load, current flows from the sourcing load, through the second NPN transistor, and to the ground.

BRIEF DESCRIPTION OF DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
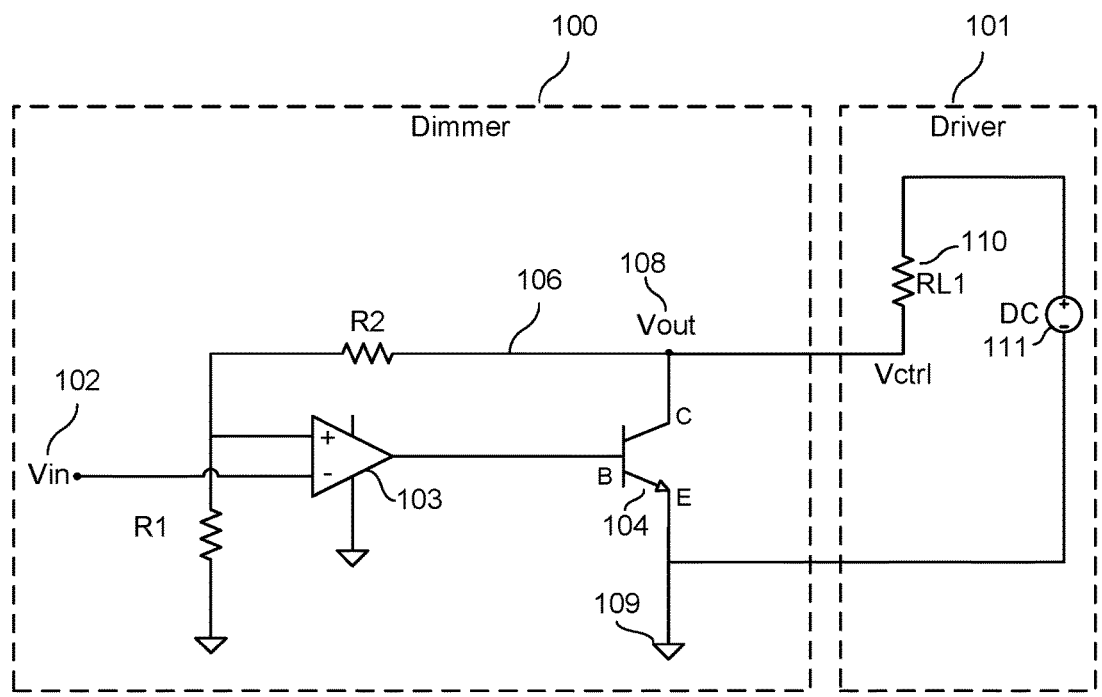

FIG. 1 shows a prior art sink only dimmer circuit.

Figure 2A:
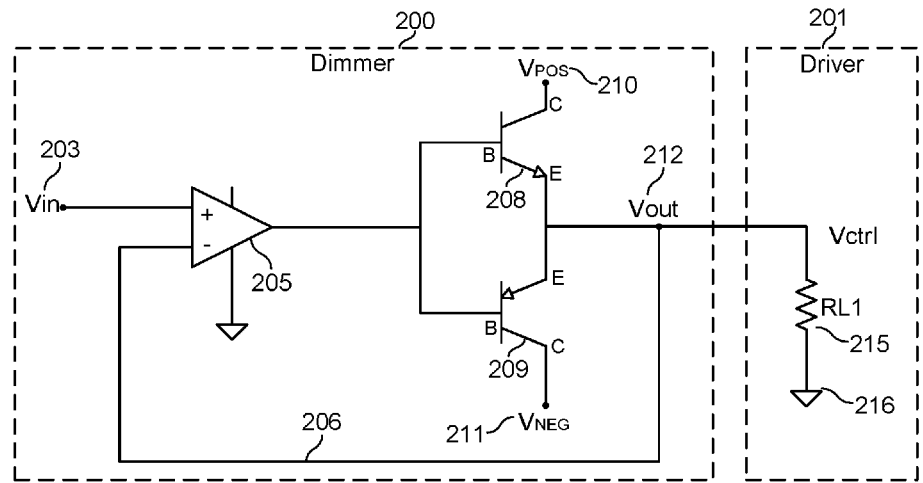

FIG. 2A shows a prior art push-pull drive circuit with opamp feedback loop coupled to a sinking load.

Figure 2B:
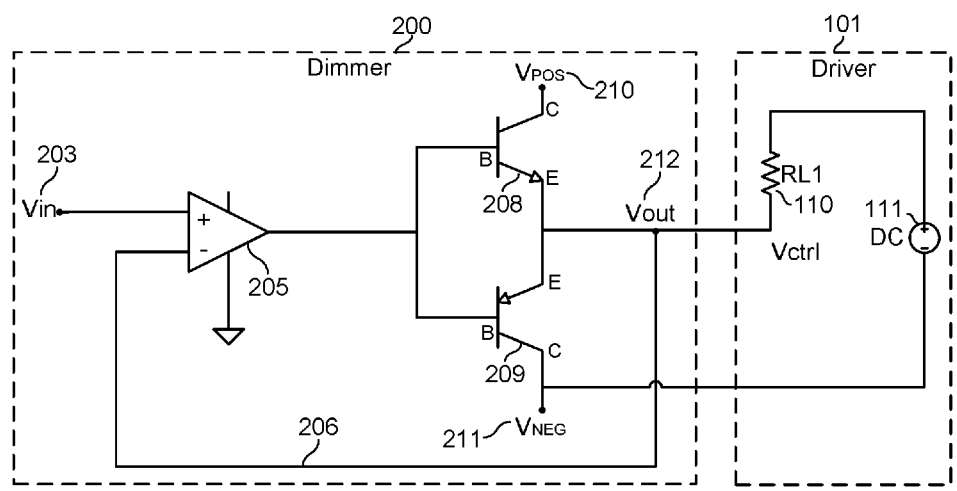

FIG. 2B shows the prior art push-pull drive circuit with opamp feedback loop coupled to a sourcing load.

Figure 3A:
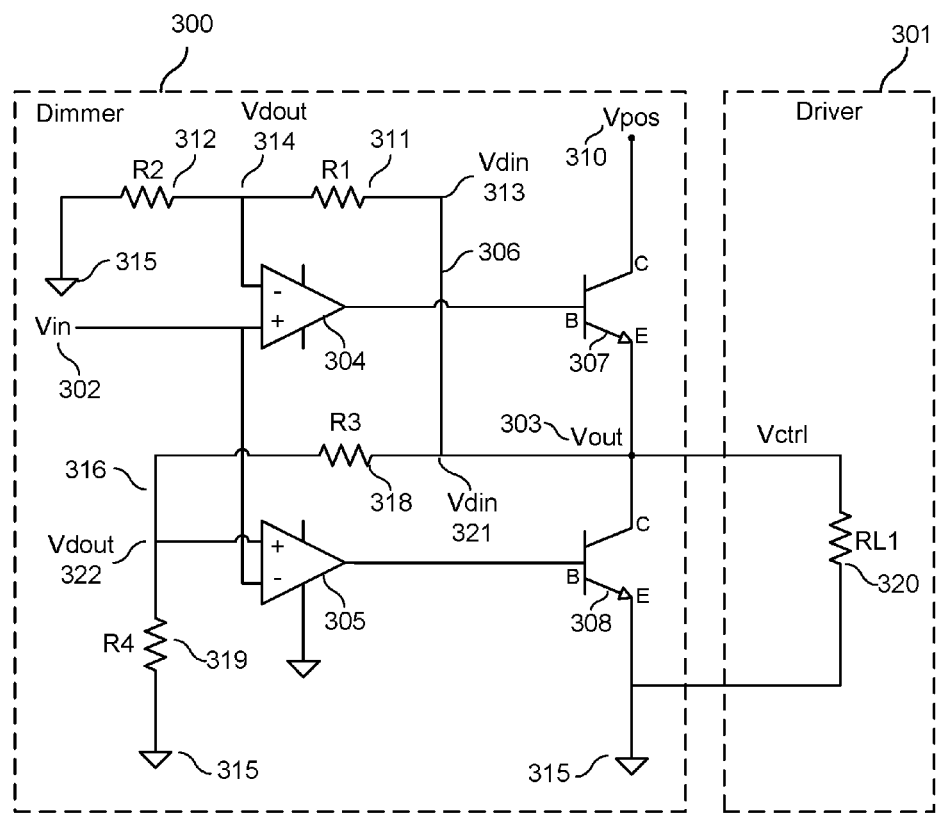

FIG. 3A shows a sinking and sourcing dimmer circuit coupled to a sinking load according to an embodiment.

Figure 3B:
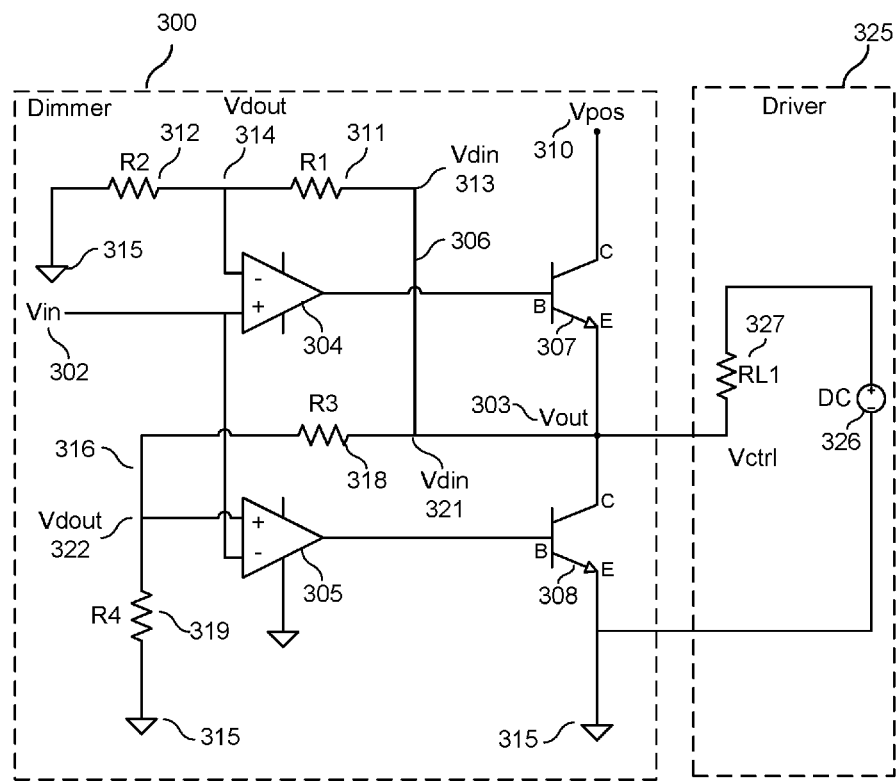

FIG. 3B shows the sinking and sourcing dimmer circuit coupled to a sourcing load according to an embodiment.

Figure 4:
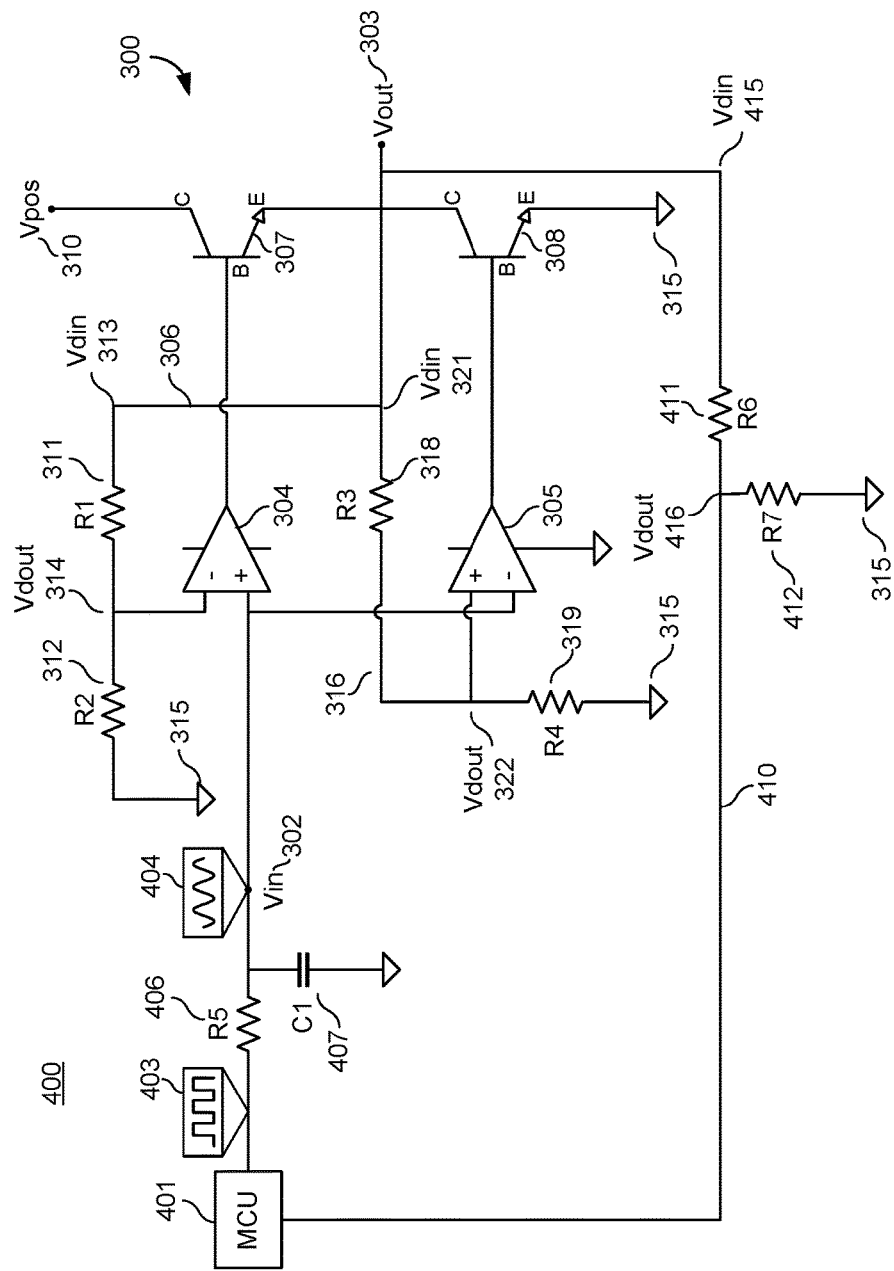

FIG. 4 shows a dimmer circuit containing the sinking and sourcing dimmer circuit according to an embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices disclosed herein.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Sink Only Dimmer Circuit
101 Current Sourcing Driver
102 Control Voltage Input Vin
103 Opamp
104 NPN Transistor
106 Feedback Loop
108 Output Voltage Signal Vout
109 Ground
110 Load
111 DC Power Supply
200 Push-Pull Drive Circuit with Opamp Feedback Loop
201 Sinking Driver
203 Control Voltage Input Vin
205 Opamp
206 Feedback Loop
208 NPN Transistor
209 PNP Transistor
210 Positive Power Supply Vpos
211 Negative Power Supply Vneg
212 Output Voltage Signal Vout
215 Load
216 Ground
300 Sinking and Sourcing Dimmer Circuit
301 Sinking LED Driver
302 Control Voltage Input Vin
303 Output Voltage Signal Vout
304 First Opamp
305 Second Opamp
306 First Feedback Loop
307 First NPN Transistor
308 Second NPN Transistor
310 Positive Power Supply Vpos
311 First Resistor
312 Second Resistor
313 Input Voltage to the Two-Resistor Divider Vdin
314 Output Voltage Out of the Two-Resistor Divider Vdout
315 Ground
316 Second Feedback Loop
318 Third Resistor
319 Fourth Resistor
321 Input Voltage to the Two-Resistor Divider Vdin
322 Output Voltage Out of the Two-Resistor Divider Vdout
325 Current Sourcing Driver
326 DC Power Supply
327 Load
400 Dimmer Circuit
401 Microcontroller
403 Variable Duty Cycle Waveform
404 Analog Waveform
406 Fifth Resistor
407 Capacitor
410 Feedback Loop
411 Sixth Resistor
412 Seventh Resistor
415 Input Voltage to the Two-Resistor Divider Vdin
416 Output Voltage Out of the Two-Resistor Divider Vdout

LIST OF ACRONYMS USED IN THE SPECIFICATION IN ALPHABETICAL ORDER

The following is a list of the acronyms used in the specification in alphabetical order.

AC Alternating Current
DC Direct Current

FET Field-Effect Transistor
Hz Hertz
LED Light Emitting Diode
MCU Microcontroller Unit
NPN Negative-Positive-Negative
opamp Operational Amplifier
PNP Positive-Negative-Positive
PWM Pulse Width Modulation
V Volt

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The present embodiments provide devices, systems, software, and methods for load control devices. More particularly, the present embodiments provide a lighting dimmer that provides sinking and sourcing current outputs.

Referring to FIGS. 3A-3B, there is shown a dimmer circuit 300 configured for providing sinking and sourcing current outputs. Although the sinking and sourcing dimmer circuit 300 is described below as providing a variable output voltage signal Vout 303 to LED drivers, the circuit 300 may control other types of lighting devices or loads, such as fluorescent ballasts, fan speed, fluid flow actuators, or the like. The variable output voltage signal Vout 303 may output a voltage signal in the range from about 0V to about 10V, depending upon the desired dimming level. According other embodiments, circuit 300 may produce a dimming signal of another voltage range. Circuit 300 is configured for providing a variable output voltage signal Vout 303 to a sinking LED driver 301 (FIG. 3A) or a sourcing LED driver 325 (FIG. 3B). The LED drivers 301/325 use the variable voltage signal Vout 303 to control power delivered to an LED element (not shown) according to the desired dimming level as indicated by the voltage level of the variable voltage signal Vout 303.

A dimmer comprising the sinking and sourcing dimmer circuit 300 may include additional components and circuit elements configured for providing the output voltage signal Vout 303. The dimmer may be connected in series with an alternating current (AC) power source (not shown), such as an AC mains power source, to receive electric AC power signal. In an embodiment of the invention, the AC power source may comprise 120 Volt (V) 60 Hertz (Hz) AC mains residential power supply. In other embodiments, the AC power source may supply power at a different voltage or frequency. For example, in another embodiment, the AC power source may supply 220V 50 Hz AC mains power supply. The dimmer may comprise circuit components (not shown) for converting the incoming AC power signal to a DC power signal. The dimmer may comprise an actuator (not shown) that receives an input from a user indicating the desired dimming level. The dimmer may use this user input to produce the control voltage input signal Vin 302 to the sinking and sourcing dimmer circuit 300 at a particular voltage level corresponding to the desired dimming level.

The sinking and sourcing dimmer circuit 300 may comprise first and second amplifiers, or opamps, 304 and 305, first and second NPN transistors 307 and 308, and first and second independent feedback loops 306 and 316, respectively. While circuit 300 shown in FIGS. 3A-3B as being implemented using NPN transistors 307 and 308, the circuit may also be implemented using other types of n-channel transistors, such as n-channel field-effect transistors (FET). Each such n-channel transistor may comprise a first terminal having one of a base (B) and a gate (G), a second terminal having one of a collector (C) and a drain (D), and a third terminal having one of an emitter (E) and a source (S).

The first opamp 304 may be connected at its non-inverting input (+) to a control voltage input Vin 302, at its inverting input (−) to a first feedback loop 306, and at its output to the base (B) of a first NPN transistor 307. The first feedback loop 306 may comprise a resistive voltage divider such as a two-resistor voltage divider comprising a first resistor 311 and a second resistor 312 connected in series. The input voltage to the two-resistor divider Vdin 313 at the top of the divider is coupled to the output voltage signal Vout 303. The output voltage out of the two-resistor divider Vdout 314 is connected to the inverting input (−) of the first opamp 304. The output voltage out of the two-resistor divider Vdout 314 is found at the node between the two resistors 311 and 312. The bottom of the divider is connected to the ground 315. The first NPN transistor 307 is connected at its collector (C) to a positive power supply Vpos 310 and at its emitter (E) to the output voltage signal Vout 303. The positive power supply Vpos 310 may comprise voltage value greater than the desired output voltage signal Vout 303 to compensate for voltage drop of the circuit components. For example, for a 10V Vout 303, the positive power supply Vpos 310 may comprise 12V or more.

The sinking and sourcing dimmer circuit 300 may further comprise a second opamp 305 connected at its inverting input (−) to the control voltage input Vin 302, at its non-inverting input (+) to a second feedback loop 316, and at its output to the base (B) of a second NPN transistor 308. The second feedback loop 316 may comprise a resistive voltage divider such as a two-resistor voltage divider comprising a third resistor 318 and a fourth resistor 319 connected in series. The input voltage to the two-resistor divider Vdin 321 at the top of the divider is coupled to the output voltage signal Vout 303. The output voltage out of the two-resistor divider Vdout 322 is connected to the non-inverting input (+) of the second opamp 305. The output voltage out of the two-resistor divider Vdout 322 is found at the node between the two resistors 318 and 319. The bottom of the divider is connected to the ground 315. The second NPN transistor 308 is connected at its collector (C) to the output voltage signal Vout 303 and at its emitter (E) to the ground 315.

Depending on the type of driver or load a dimmer containing the sinking and sourcing dimmer circuit 300 is connected to, the feedback loops 306 and 316 will turn either transistor 307 or transistor 308 on. For example, as shown in FIG. 3A, the output voltage signal Vout 303 of circuit 300 may be connected to a sinking driver 301, which typically comprises a load 320 connected to ground 315. When circuit 300 is connected to a non-sourcing or sinking driver 301, the control voltage input Vin 302 causes current to flow from Vpos 310 through the first NPN transistor 307 and to the output load 320 of the driver 301. The load 320 is pulled up to receive voltage from the positive power supply Vpos 310.

Referring now to FIG. 3B, dimmer containing circuit 300 may also be connected to a current sourcing driver 325. The current sourcing driver 325 may comprise a direct current (DC) power supply 326 that provides a voltage source to a load 327. As such, load 327 of driver 325 sources current. Current flows from the load 327, through transistor 308 and to the ground 315. Because transistor 308 is a NPN type of transistor, and the second opamp 305 comprises inverted logic such that Vout 303 is driven high, voltage drop between $V_{BE}$, which is typically 0.7V does not cause a problem, and voltage drop at $V_{CE}$ is minimal. Accordingly, using the NPN transistor 308, the output can be driven close to zero and the circuit 300 does not require a negative power supply. Additionally, the sinking and sourcing dimmer circuit 300 also does not require a PNP type transistor, which is generally more expansive and less readily available than a NPN type transistor. Additionally, NPN type transistors are generally preferred over PNP type transistors because of their faster operating speed.

According to a further embodiment, the first and second opamps 304 and 305 may provide voltage amplification to the control voltage input Vin 302. Generally, in dimmer circuits the control voltage input Vin 302 is generated by a microcontroller (e.g., 401 in FIG. 4) based on a user input of the desired dimming level. The microcontroller, however, may be limited by the amount of voltage it can output, while the output voltage signal Vout 303 needs to span from 0V to 10V. Therefore, voltage amplification in a dimmer circuit application is desired. For example, the control voltage input Vin may range between 0V to 5V. To output a variable output voltage signal Vout 303 of between 0V and 10V, the gain of opamps 304 and 305 may be approximately two. The resistive voltage divider comprising resistors 311 and 312 of the feedback loop 306 ensures that only a fraction of the amplified output voltage Vout 303 is fed back to the inverted input (−) of the first opamp 304. For example, the resistive voltage divider of feedback loop 306 may divide the 0-10V Vout signal 303 such that the output voltage Vdout out of the two-resistor divider ranges between 0-5V (to match the control voltage input Vin 302). Similarly, the resistive voltage divider comprising resistors 318 and 319 of the feedback loop 316 may operate in a similar fashion as feedback loop 306.

According to a further embodiment, in addition to the independent feedback loops 306 and 316, the gain of second opamp 305 may be greater than the gain of the first opamp 304 to ensure there is no undesired contention between the first NPN transistor 307 and the second NPN transistor 308. If the gains of opamps 304 and 305 were set equal, however, the circuit 300 would turn both first and second NPN transistors 307 and 308 on such that current would flow from positive power supply Vpos 310 through the first and second NPN transistors 307 and 308 to circuit common, causing improper circuit operation. For example, if the control voltage input Vin 302 is set to 5V, and the gains of the first opamp 304 and the second opamp 305 are both equal to two, the opamps 304/305 are both going to attempt to drive their outputs to 10V. This will cause the first NPN transistor 307 to drive the output voltage signal Vout 303 at about 10.1V and the second NPN transistor 308 to drive the output voltage signal Vout 303 at about 9.99V—causing a contention between the NPN transistors 307 and 308.

However, setting the gain of the second opamp 305 higher than the gain of the first opamp 304 eliminates this contention. According to an embodiment, the difference in the gains should be set as close as possible to produce an accurate output voltage signal Vout 303. The difference in the gains should also be sufficient to cover tolerances of components without sacrificing accuracy of the output voltage signal Vout 303. The higher the tolerances of the components, the closer the gains may be set. For example, the gain of the first NPN transistor 307 may be slightly less than two, and the gain of the second NPN transistor 308 may be slighting above two. In such a case, if the control voltage input Vin 302 is set to 5V, the second NPN transistor 307 will try to set output voltage signal Vout 303 to approximately 10.1V, and the first NPN transistor 307 will try to set the output voltage signal Vout 303 to approximately 9.9V. So depending whether the sinking and sourcing dimmer circuit 300 is connected to a sinking LED driver 301 or sourcing LED driver 325, the circuit 300 will pick one of the two voltages. In FIG. 3A, where the load resistor 320 is sinking, the resistor 320 cannot drive circuit 300 up to 10V, it can just reduce the voltage. Thus, the first NPN transistor 307 will turn on, resulting in approximately 9.9V output voltage signal Vout 303. In FIG. 3B, where the load resistor 327 is trying to source the voltage up, the second NPN transistor 308 will turn on, resulting in approximately 10.1V output voltage signal Vout 303. Thus, depending on the mode of operation, the output voltage signal Vout 303 may vary slightly to prevent the transistors from fighting.

Referring to FIG. 4, a dimmer circuit 400 containing the sinking and sourcing dimmer circuit, as described in FIGS. 3A-3B, may further contain a microcontroller unit (MCU) 401 configured for generating a variable duty cycle waveform 403 based on an input from a used indicating a desired dimming level. The MCU 401 may utilize pulse width modulation (PWM) to generate the variable duty cycle waveform 403 with the desired dimming level. The dimmer circuit 400 may further contain a resistor-capacitor circuit (RC circuit) comprising a fifth resistor 406 and capacitor 407 configured for smoothing out the variable duty cycle waveform 403 into an analog waveform 404. The analog waveform 404 is fed as the control voltage input Vin 302 into the sinking and sourcing dimmer circuit 300.

Additionally, the microcontroller 401 may monitor the output voltage signal Vout 303 through a feedback loop 410 to detect a fault in the circuit. For example, wires may be shorted or the circuit may produce too much current. The feedback loop 410 may be connected at one end to the output voltage signal Vout 303 and at another end to the microcontroller 401. The feedback loop 410 may comprise a resistive voltage divider, such as a two-resistor voltage divider, comprising a sixth resistor 411 and a seventh resistor 412 connected in series. The input voltage to the two-resistor divider Vdin 415 at the top of the divider is coupled to the output voltage signal Vout 303. The output voltage out of the two-resistor divider Vdout 416, at the node between the two resistors 411 and 412, is connected to microcontroller 401. The bottom of the divider is connected to the ground 315. The divider outputs a fraction of the output voltage signal Vout 303, for example between 0V to 5V, such that it can be read by the microcontroller 401. The microcontroller 401 monitors the fractioned output voltage signal Vout 303 and checks whether it is within a predetermined tolerance level. If the fractioned output voltage signal Vout 303 is determined to be outside of the tolerance level, the microcontroller 401 records a fault in the circuit and disables the output circuit.

INDUSTRIAL APPLICABILITY

The disclosed embodiments provide a system, software, and a method for load control devices, and more particularly a lighting dimmer that provides sinking and sourcing current outputs. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the invention.

What is claimed is:

1. A dimmer circuit that provides sinking and sourcing current outputs, comprising:
   first and second amplifiers each comprising a non-inverting input (+), an inverting input (−), and an output;
   first and second transistors each comprising a first terminal having one of a base and a gate, a second terminal having one of a collector and a drain, and a third terminal having one of an emitter and a source;
   wherein the first amplifier is connected at its non-inverting input (+) to a control voltage input (Vin), at its inverting input (−) to an output voltage signal (Vout) via a first feedback loop, and at its output to the first terminal of the first transistor;
   wherein the first transistor is connected at its second terminal to a positive power supply (Vpos) and at its third terminal to the output voltage signal (Vout);
   wherein the second amplifier is connected at its inverting input (−) to the control voltage input (Vin), at its non-inverting input (+) to the output voltage signal (Vout) via a second feedback loop, and at its output to the first terminal of the second transistor;
   wherein the second transistor is connected at its second terminal to the output voltage signal (Vout) and at its third terminal to the ground.

2. The dimmer circuit of claim 1, wherein each of the transistors comprises an NPN transistor.

3. The dimmer circuit of claim 1, wherein each of the transistors comprises a n-channel field-effect transistor.

4. The dimmer circuit of claim 1, wherein when the output voltage signal (Vout) is coupled to a sinking load, current flows from the positive power supply (Vpos), through the first transistor, and to the sinking load.

5. The dimmer circuit of claim 4, wherein when the output voltage signal (Vout) is coupled to a sourcing load, current flows from the sourcing load, through the second transistor, and to the ground.

6. The dimmer circuit of claim 1, wherein the output voltage signal (Vout) comprises a variable voltage signal in the range from about 0V to about 10V.

7. The dimmer circuit of claim 1, wherein the first feedback loop comprises a first resistive voltage divider comprising a first resistor and a second resistor connected in series, wherein an input voltage to the first resistive voltage divider (Vdin) is connected to the output voltage signal (Vout) and the output voltage out of the first resistive voltage divider (Vdout) is connected to the inverting input (−) of the first amplifier.

8. The dimmer circuit of claim 7, wherein the second feedback loop comprises a second resistive voltage divider comprising a third resistor and a fourth resistor connected in series, wherein an input voltage to the second resistive voltage divider (Vdin) is connected to the output voltage signal (Vout) and the output voltage out of the second resistive voltage divider (Vdout) is connected to the non-inverting input (+) of the second amplifier.

9. The dimmer circuit of claim 8, wherein each of the first and second amplifiers provides a gain to the control voltage input (Vin) to output an amplified output voltage signal (Vout), and wherein each of the first and second resistive voltage dividers of the first and second feedback loops provides a fraction of the amplified output voltage (Vout) back to the first and second amplifiers.

10. The dimmer circuit of claim 1, wherein each of the first and second amplifiers provides a gain to the control voltage input (Vin) to output an amplified output voltage signal (Vout), wherein the gain of the second amplifier is greater than the gain of the first amplifier.

11. The dimmer circuit of claim 10, wherein the difference in the gains prevents contention between the first and second transistors.

12. The dimmer circuit of claim 10, wherein the gains are set as close as possible to cover tolerances of components of the circuit without sacrificing accuracy of the output voltage signal (Vout).

13. The dimmer circuit of claim 1 further comprises a microcontroller unit configured for generating a variable duty cycle waveform indicating a desired dimming level; wherein the dimmer circuit further contains an RC circuit configured for smoothing out the variable duty cycle waveform into a variable analog waveform.

14. The dimmer circuit of claim 1 further comprising a microcontroller and a third feedback loop connected at its first end to the output voltage signal (Vout) and at its second end to the microcontroller, wherein the microcontroller is configured for detecting a fault.

15. The dimmer circuit of claim 14, wherein the microcontroller is configured for:
  monitoring the output voltage signal (Vout);
  determining whether the output voltage signal (Vout) is within a predetermined tolerance level; and
  disabling the output voltage signal (Vout) when the output voltage signal (Vout) is outside of the predetermined tolerance level.

16. The dimmer circuit of claim 14, wherein the third feedback loop comprises a resistive voltage divider, wherein an input voltage to the resistive voltage divider (Vdin) is connected to the output voltage signal (Vout) and an output voltage out of the resistive voltage divider is connected to the microcontroller, wherein the resistive voltage divider outputs a fraction of the output voltage signal (Vout).

17. A dimmer circuit that provides sinking and sourcing current outputs, comprising:
  first and second amplifiers each comprising a non-inverting input (+), an inverting input (−), and an output;
  first and second transistors each comprising a first terminal having one of a base and a gate, a second terminal having one of a collector and a drain, and a third terminal having one of an emitter and a source;
  wherein the first amplifier is connected at its non-inverting input (+) to a control voltage input (Vin), at its inverting input (−) to an output voltage signal (Vout) via a first feedback loop, and at its output to the first terminal of the first transistor;
  wherein the first transistor is connected at its second terminal to a positive power supply (Vpos) and at its third terminal to the output voltage signal (Vout);
  wherein the second amplifier is connected at its inverting input (−) to the control voltage input (Vin), at its non-inverting input (+) to the output voltage signal (Vout) via a second feedback loop, and at its output to the first terminal of the second transistor;
  wherein the second transistor is connected at its second terminal to the output voltage signal (Vout) and at its third terminal to the ground;
  wherein when the output voltage signal (Vout) is coupled to a sinking load, current flows from the positive power supply (Vpos), through the first transistor, and to the sinking load;
  wherein when the output voltage signal (Vout) is coupled to a sourcing load, current flows from the sourcing load, through the second transistor, and to the ground;
  wherein each of the first and second amplifiers provides a gain to the control voltage input (Vin) to output an amplified output voltage signal (Vout), wherein the gain of the second amplifier is greater than the gain of the first amplifier, wherein the difference in the gains prevents contention between the first and second transistors.

18. A dimmer circuit that provides sinking and sourcing current outputs, comprising:
  first and second amplifiers each comprising a non-inverting input (+), an inverting input (−), and an output;
  first and second NPN transistors each comprising a base, a collector, and an emitter;
  wherein the first amplifier is connected at its non-inverting input (+) to a control voltage input (Vin), at its inverting input (−) to an output voltage signal (Vout) via a first feedback loop, and at its output to the base of the first NPN transistor;
  wherein the first NPN transistor is connected at its collector to a positive power supply (Vpos) and at its emitter to the output voltage signal (Vout);
  wherein the second amplifier is connected at its inverting input (−) to the control voltage input (Vin), at its non-inverting input (+) to the output voltage signal (Vout) via a second feedback loop, and at its output to the base of the second NPN transistor;
  wherein the second NPN transistor is connected at its collector to the output voltage signal (Vout) and at its emitter to the ground;
  wherein when the output voltage signal (Vout) is coupled to a sinking load, current flows from the positive power supply (Vpos), through the first NPN transistor, and to the sinking load; and
  wherein when the output voltage signal (Vout) is coupled to a sourcing load, current flows from the sourcing load, through the second NPN transistor, and to the ground.

\* \* \* \* \*